W. ROGOWSKI.
MEASURING MAGNETIC PROPERTIES OF MATERIALS AND APPARATUS THEREFOR.
APPLICATION FILED AUG. 5, 1913.
1,204,489.
Patented Nov. 14, 1916.
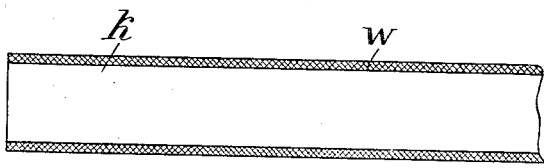
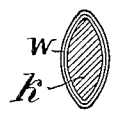
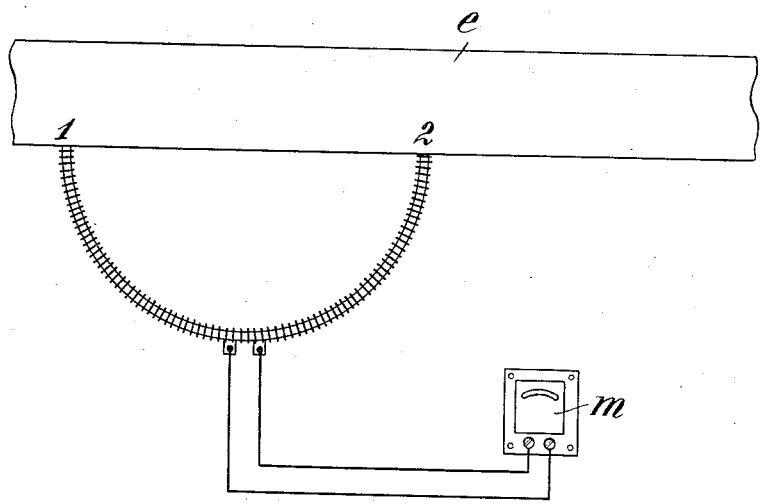
Witnesses
Marguerite Schaup
Ray J Ernst
Inventor
Walter Rogowski
by
his Attorneys

UNITED STATES PATENT OFFICE.

WALTER ROGOWSKI, OF BERLIN-CHARLOTTENBURG, GERMANY, ASSIGNOR TO SIEMENS & HALSKE A. G., OF BERLIN, GERMANY, A CORPORATION OF GERMANY.

MEASURING MAGNETIC PROPERTIES OF MATERIALS AND APPARATUS THEREFOR.

1,204,489.     Specification of Letters Patent.     Patented Nov. 14, 1916.

Application filed August 5, 1913. Serial No. 783,181.

*To all whom it may concern:*

Be it known that I, WALTER ROGOWSKI, a citizen of the German Empire, and resident of Berlin-Charlottenburg, Germany, have invented certain new and useful Improvements in Measuring Magnetic Properties of Materials and Apparatus Therefor, of which the following is a specification.

My invention relates to a novel method of measuring magnetic qualities of materials, for instance for determining the ampere-turns necessary for magnetizing any magnetizable part of electric machines, such as yokes teeth magnet bodies armatures and the like. Also for carrying my invention into effect I have devised a practical instrument for measuring the magnetic flow, or more precisely stated, the magnetic tension existing between two points of the magnetic circuit. More theoretically expressed, the quantity to be measured by my present invention may be stated as being the line integral of the magnetic strength. It may further be remarked that this quantity may be of interest for other purposes.

The present art of measuring magnetic tensions is limited to measuring methods for the magnetic tension in closed magnetic circuits, that is to say the line integral of the magnetic field strength developed in a closed magnetic circuit. By my present invention, now, I am enabled to determine the drop of magnetic flow existing between two points of the magnetic circuit which will immediately be a measure for the magnetic tension existing between the said two points.

In order to give a clear understanding of the method and apparatus of my present invention it will be necessary to briefly set forth the theory of the measuring method, which I aim to give in the following, without, however, intending to base my invention upon the correctness of this theory.

In electrical circuits it is of great importance to measure the potential drop between the several points of the electrical circuit in addition to the value of the total driving E. M. F. Likewise it is of particular importance in addition to measuring the magneto motive force which is given by the number of exciting ampere turns, to be able to measure in magnetic circuits the so-called magnetic tension existing upon any desired path between any two points of a magnetic circuit. The magnetic tension between two points 1 and 2 of a magnetic field, as well known, is determined by the line integral $$\int_1 \mathfrak{H}_s ds$$ over the magnetic field strength $\mathfrak{H}$ along a line which may be arbitrarily drawn between these two points. In this formula $s$ designates the length of the path which is measured on the axis of the coil. According to this invention, now, I have devised an instrument which so far has been wanting among the measuring instruments, viz. an instrument for measuring these magnetic tensions. The operation of my present invention is based upon the following consideration: If a coil be brought in a variable magnetic field an E. M. F. will be set up in said coil. If the flow of induction be designated with $\Phi$, the surface surrounded by a turn by F, and the perpendicular to this surface with $s$, then will be obtained the following relation:

$$\Phi = \mathfrak{B}_s \cdot F,$$

wherein $\mathfrak{B}_s$ is the normal component of the magnetic induction. If a coil be made of constant cross-section and evenly spaced turns throughout, with such coil the magnetic tension between any two points may be measured upon any desired path. If F be the cross-section of the coil and N the number of turns per length unit then the total magnetic flow will be:

$$\Phi = NF \int_1^2 \mathfrak{B} \cdot dx = K \int_1^2 \mathfrak{H} \cdot dx.$$

In this formula K is a constant, $\mathfrak{B}$ the induction, $\mathfrak{H}$ the magnetic field strength and $x$ the length measured upon the axis of the coil. The integral $\int_1^2 \mathfrak{H} dx$ now, is identical with the magnetic tension between the terminals 1 and 2 of the coil. Since the magnetic flow $\Phi$ may be measured according to a ballistic method or by means of alternating current, the same therefore may be done with the magnetic tension which is proportional to this quantity.

The number of turns which are present upon the part of the coil of the length $ds$ will be $Nds$ and the E. M. F. induced in this part of the coil will then be $$\text{E. M. F. (partial)} = -Nds \frac{d(\mathfrak{B}_s \cdot F)}{dt}.$$

Accordingly the E. M. F. set up in the total coil will be given by the following equation:

$$\text{E. M. F. (total)} = -\int_1^{^{0_2}} N \frac{d(\mathfrak{B}_s \cdot F)}{dt} ds.$$

From this equation it follows that if N be the number of turns per length unit and if the cross-section F of the coil be constant all along its length, if furthermore the surface F be invariable with the time, the induced E. M. F. will also be expressed by the following relation:

$$E = -N \cdot F \frac{d}{dt} \int_1^{^{0_2}} \mathfrak{B}_s ds = -N \cdot F \frac{d}{dt} \int_1^{^{0_2}} \mu \mathfrak{H}_s ds.$$

From this it follows that $$-\int \mu \mathfrak{H}_s ds = \int \frac{E}{N \cdot F} dt.$$

If $\mu$ be the permeability of the medium within the coil, this permeability being constant throughout the interior of the coil and invariable with the time, we will obtain:

$$-\int \mathfrak{H}_s ds = \frac{1}{\mu} \frac{1}{NF} \int E dt.$$

The time integral of the induced E. M. F. therefore under the stated assumption will be an immediate measure of the magnetic tension.

My new method of measuring the magnetic tension existing between any points of any desired path consists therein that the coil in which the number of windings per length unit and the cross-section of the coil is constant at every place, is brought with both free ends at places of the magnetic field between which the magnetic tension shall be measured.

Provided that the magnet to be tested is excited with direct current, for instance, a ballistic galvanometer is placed at the ends of the coil. If the exciting current be reversed then $\mathfrak{H}_s$ will be changed into $-\mathfrak{H}_s$ and by the galvanometer a time integral of the E. M. F. will be indicated which may be expressed by the following formula:

$$\int E dt = -2NF\mu \int \mathfrak{H}_s ds.$$

From this formula the following relation follows:

$$\int \mathfrak{H}_s ds = \frac{1}{\mu} \frac{1}{NF} \frac{1}{2} \int E dt.$$

In this latter formula $\int E dt$ is the value indicated by the measuring instrument.

Instead of reversing the exciting current of the magnetic circuit also a current interrupting device or a current closing device may be used provided that errors due to remanent magnetism are not to be expected.

In case, now, the magnetic circuit to be tested be excited by alternating current, the coil may advantageously be connected with an oscillograph. This oscillograph will record the course of the E. M. F. E induced in the coil as a function of the time and the value $\int E dt$ may be obtained from the oscillograph by integration.

The apparatus of carrying out the above set forth measurements according to my invention will be more fully understood by reference to the accompanying drawing, of which—

Figures 1 and 2 show in a longitudinal and in a transverse section, respectively, one form of carrying my invention into effect and of which Fig. 3 shows by the way of example in a diagrammatic view the mode of application of my present tension measuring instrument.

Referring now more particularly to the drawing; upon the core $k$, which may for instance be made of rubber or other flexible material in the form of a flat band of elliptical cross-section, a winding $w$ is provided, said winding having a plurality of turns and being arranged in one or more layers. In case a plurality of such layers are employed which are arranged one above the other, care must be taken that the number of turns per length unit is constant. The medium interiorly of the coil may be made of a material of any desired permeability but having the property of being of even permeability at all places and of being invariable with the time. Most preferably a non-magnetizable substance is chosen, therefore a substance having a permeability $\mu = 1$. If a greater sensitiveness is desired also a magnetizable material may be employed.

In Fig. 3 $e$ is an iron body forming, for instance, a part of a dynamo-electric machine. For finding the magnetic tension between the two points 1 and 2 of the iron, now, the free ends of the instrument are laid against these places to abut in such a way that the center line of the coil at its ends will form an angle of 90° with the contact surface, and then the quantity of the magnetic tension may be measured at the instrument $m$.

The line integral $\int_1^{^{0_2}} \mathfrak{H}_s ds$ is constant along two paths between the points 1 and 2 if the surface which is limited by said two paths is not permeated by the exciting ampere-turns. By this instrument, therefore, the magnetic tension in the iron body between the two points will be measured in exact analogy to the fact that in electrical circuits the voltage may be measured by a voltmeter tapping two points of the circuit. If, however, the surface between this instrument and one path within the iron $e$ be permeated by exciting ampere-turns, then, neglecting a constant factor, the line integral of the magnetic field strength over the closed path from point 1 over the instrument to point 2 and in the iron $e$ back to point 1 will be equal to the number of ampere-turns permeating the surface. The tension indicated by the instrument will therefore not be equal to the magnetic tension to be determined between the two points 1 and 2 in the iron body, but differ from this by the number of exciting ampere-turns permeating the surface, said number being multiplied with the aforesaid constant factor. The number of exciting ampere-turns being easily obtainable by other measurements, by the aid of the instrument of my present invention the magnetic tension between the points 1 and 2 in the iron may thus readily be found. From this latter fact follows immediately, that with my present instrument it will also be possible to determine the number of ampere-turns of electrical circuits. For this purpose the instrument only needs to be placed around the current-carrying windings of the electrical circuit and the ends of the instrument be united. In this case one will be enabled to determine the line integral of the magnetic field strength along a closed path surrounding the exciting ampere-turns.

Having thus described my invention I claim as new and desire to secure by Letters Patent of the United States:—

1. The method of measuring the magnetic tension between two points of a magnetic circuit, which consists in variably exciting said magnetic circuit, branching said circuit at said points, and measuring the electromotive force which is induced in a coil arranged in said branched circuit.

2. An instrument for measuring magnetic quantities consisting of a coil connected to an electrical measuring instrument and a core for said coil, the windings of said coil being evenly distributed over the entire length of said core, said core and said coil having their ends adapted to make close contact with the magnetic circuit to be tested.

3. An instrument for measuring magnetic quantities, consisting of a coil of even cross-section and evenly spaced turns throughout its length, said coil being adapted to make close contact at both ends with the material to be tested and means for measuring the magnetic flow in said coil.

4. An instrument for measuring magnetic quantities, consisting of a flexible core of non-magnetic material, and having even cross-section, a winding thereon distributed uniformly over the entire length of said core, the end turns of said winding being shaped for making close contact with the material to be tested and an electrical measuring instrument connected to the ends of said winding.

In witness whereof I have hereunto set my signature in the presence of two subscribing witnesses.

WALTER ROGOWSKI.

Witnesses:
WOLDEMAR HAUPT,
HENRY HASPER.